(12) United States Patent
Matoy et al.

(10) Patent No.: US 9,031,754 B2
(45) Date of Patent: May 12, 2015

(54) TOWING VEHICLE CONTROLLER PROVIDING BRAKE CONTROL TO A TOWED VEHICLE AND METHOD

(75) Inventors: Eric A. Matoy, Orion, MI (US); Michael D. Tober, Bay Village, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 860 days.

(21) Appl. No.: 13/252,668

(22) Filed: Oct. 4, 2011

(65) Prior Publication Data

US 2013/0085649 A1 Apr. 4, 2013

(51) Int. Cl.
 *B60T 7/20* (2006.01)
 *B60T 8/17* (2006.01)
 *B60T 13/68* (2006.01)

(52) U.S. Cl.
 CPC ............. *B60T 8/1708* (2013.01); *B60T 7/20* (2013.01); *B60T 13/686* (2013.01)

(58) Field of Classification Search
 USPC .......................................................... 701/70
 See application file for complete search history.

(56) References Cited

U.S. PATENT DOCUMENTS

| | | | | |
|---|---|---|---|---|
| 2,508,057 | A * | 5/1950 | Bishop | ............................. 244/50 |
| 4,538,641 | A * | 9/1985 | Chatterjea | .................. 137/596.1 |
| 5,411,322 | A | 5/1995 | Breen | |
| 6,131,691 | A * | 10/2000 | Morch | .......................... 180/418 |
| 6,349,998 | B1 | 2/2002 | Franke et al. | |
| 6,450,019 | B1 * | 9/2002 | Wetzel et al. | .................... 73/129 |
| 6,516,260 | B2 | 2/2003 | Wetzel et al. | |
| 6,516,925 | B1 | 2/2003 | Napier et al. | |
| 7,216,026 | B2 | 5/2007 | Heuer | |
| 7,226,134 | B2 | 6/2007 | Horn et al. | |
| 2001/0054524 | A1 * | 12/2001 | Masters et al. | ................. 180/400 |
| 2005/0017577 | A1 * | 1/2005 | Eckert et al. | ................... 303/123 |
| 2006/0033308 | A1 * | 2/2006 | Waldbauer et al. | ........ 280/455.1 |
| 2006/0076827 | A1 * | 4/2006 | Albright et al. | ............... 303/123 |
| 2006/0287797 | A1 * | 12/2006 | Haller et al. | ..................... 701/70 |
| 2008/0177454 | A1 | 7/2008 | Bond et al. | |
| 2009/0093928 | A1 * | 4/2009 | Getman et al. | ................... 701/37 |
| 2009/0210112 | A1 * | 8/2009 | Waldbauer et al. | ............. 701/42 |
| 2009/0326755 | A1 * | 12/2009 | Risse et al. | ....................... 701/29 |

(Continued)

OTHER PUBLICATIONS

PCT International Search Report of Oct. 19, 2012, 3 pages.
PCT Written Opinion of the International Searching Authority of Oct. 19, 2012, 14 pages.

(Continued)

*Primary Examiner* — Shelley Chen
(74) *Attorney, Agent, or Firm* — Cheryl L. Greenly; Eugene E. Clair; Brian E. Kondas

(57) ABSTRACT

Various embodiments of a towing vehicle controller and methods for brake control of a towed vehicle are provided. A towing vehicle controller includes: an input for receiving a load signal indicative of a load of a towed and towing vehicle combination; an input for receiving a stability signal indicative of at least one of a yaw rate, a steering angle, and a lateral acceleration of the towing vehicle; and an input for receiving a deceleration signal indicative of an automated deceleration request. Control logic is capable of determining a comparison value prior to receiving the deceleration signal and after receiving the load signal and the stability signal, wherein the determination of the comparison value is based on the load signal and the stability signal. After the deceleration signal is received, the control logic determines a brake control transmission signal based on the deceleration signal and the comparison value.

21 Claims, 4 Drawing Sheets

(56) References Cited

U.S. PATENT DOCUMENTS

2010/0007200 A1    1/2010  Pelosse
2010/0125399 A1    5/2010  Grolle
2012/0123646 A1*   5/2012  Mantini et al. .................. 701/48

OTHER PUBLICATIONS

Patent Cooperation Treaty, International Preliminary Report on Patentability, Apr. 8, 2014, 16 pages, International Bureau of WIPO, Geneva Switzerland.

* cited by examiner

TOWING VEHICLE CONTROLLER PROVIDING BRAKE CONTROL TO A TOWED VEHICLE AND METHOD

BACKGROUND

The present invention relates to a towing vehicle controller on a towing vehicle, such as a commercial vehicle tractor, that controls the air brakes of a towed vehicle, such as a commercial vehicle trailer, and a method of providing brake control. More specifically, a towing vehicle controller and a method for transmitting a control air signal from a tractor air brake system to a trailer air brake system based on stability conditions of the tractor is disclosed.

The trailer air brake system receives supply and control air from the tractor air brake system. The trailer air brake system receives the supply air when the operator actuates the trailer supply valve in the tractor cab. When the operator actuates the foot brake valve in the tractor, a control air signal is transmitted to the trailer to actuate the trailer brakes. Tractors can be equipped with one or more automated braking systems, for example, an antilock braking system (ABS), an automatic slip reduction system (ASR), a roll stability control system (RSC) and/or an electronic stability control system (ESC) in order to stabilize the vehicle in critical driving situations. By means of ABS, RSC/ESC and ASR systems, the brake pressure at individual tractor wheel end brakes is controlled independent of the operator such that locking, spinning or lifting of the wheels is avoided, and vehicle directional instability is mitigated. An ESC controller, such as the Bendix® EC-60™ advanced controller, can perform the functions of ABS and ASR on the tractor and control the transmission of the control air signal to the trailer. The trailer braking system may be equipped with an ABS or RSC system, or no electronic control system, which affects if and how the ESC controller on the tractor communicates with the trailer braking system.

Tractors may also be equipped with automated cruise control systems (ACC), such as the Bendix® Wingman® adaptive cruise with braking system or a collision mitigation system (CMT) such as the Bendix® Wingman® Advanced™ collision mitigation technology. An automated deceleration request is received by the ESC controller when the ACC or CMT system determines that the tractor is advancing too closely to a target vehicle. The ESC controller responds to the automated deceleration request first by de-throttling the engine, then applying the engine retarder. Finally, depending on the deceleration value determined as a factor of the automated deceleration request, individually applying the wheel end brakes on the tractor.

A control air signal is sent from the tractor to the trailer based on the deceleration value; however the attached trailer may or may not be equipped with an ABS or RSC system. In order to accommodate a wide variety of tractor-trailer combinations, the ESC controller on the tractor is generally programmed to transmit a control air signal to the trailer as if the trailer did not have an ABS or RSC system. Therefore, depending on the particular tractor-trailer arrangement and the electronic devices available on the trailer, the braking response of the trailer brake system may not result in optimal braking performance for the particular automated deceleration request and driving conditions.

For the foregoing reasons, there is a need for a new and improved apparatus and method which addresses the above-referenced problems.

SUMMARY

Various embodiments of a towing vehicle controller that provide brake control to a towed vehicle and methods are disclosed. In one embodiment, a towing vehicle controller includes inputs for receiving signals indicative of a load of a towed and towing vehicle combination, inputs for at least one stability signal of a yaw rate, a steering angle, and a lateral acceleration of the towing vehicle, and an input for a deceleration signal. The control logic is capable of determining a brake control transmission signal based on a deceleration signal that is received by the towing vehicle controller and a comparison value that is determined based on the load signal and at least one stability signal received by the towing vehicle controller before the deceleration signal is received.

In another embodiment, the method for controlling the brake pressure delivered from a towing vehicle to a towed vehicle includes sensing a load signal of the towing and towed vehicle combination; sensing a stability signal of the towing vehicle, which is indicative of at least one of the yaw rate, a steering angle, and the lateral acceleration of the towing vehicle; and determining a comparison value based on the load signal and the stability signal received. After determining the comparison value, the method further includes receiving a deceleration signal generated by an automated deceleration request; determining an empirical deceleration value based on the deceleration signal; and determining a brake control transmission signal based on the comparison value and the empirical deceleration value. In another embodiment the method further includes transmitting the brake control transmission signal to a towed vehicle control device.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
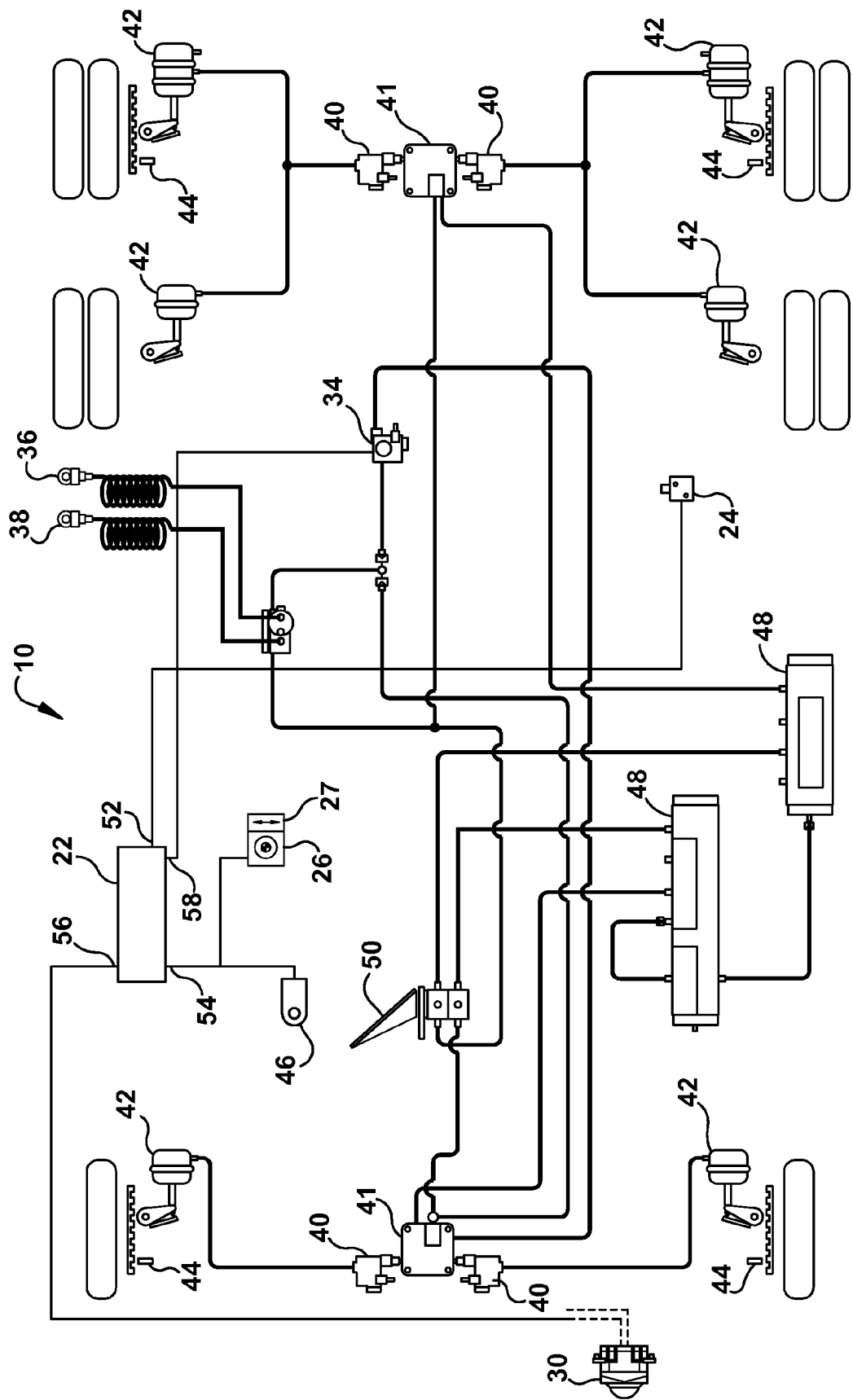
FIG. 1 illustrates a schematic representation of a braking system on a towing vehicle including a towing vehicle controller, according to an embodiment of the present invention.

With reference to FIG. 1, a towing vehicle, or tractor, air brake system 10 is shown. The system 10 includes an electronic towing vehicle controller 22 with inputs for electrically connecting to, either directly or through a vehicle serial communication bus, at least four modulators 40, at least four wheel speed sensors 44, at least two traction relay valves 41, a trailer pressure control device 34, a steering angle sensor 46, a lateral acceleration sensor 27, a yaw rate sensor 26, and a load sensor 24. The pneumatic portion of the tractor air brake system 10 includes at least four brake actuators 42, at least two reservoirs 48, and an operator actuated brake pedal 50. Each of the at least four wheel speed sensors 44 communicates the individual wheel speeds to the towing vehicle controller 22 for use in antilock braking system (ABS), automatic slip regulation (ASR), and electronic stability control (ESC) algorithms. Each of the at least four modulators 40 is connected pneumatically to one of the at least two traction relay valves 41 and to one of the at least four brake actuators 42. When equipped with ESC, the towing vehicle controller 22 is capable of actuating the tractor brakes independently of the operator in order to maintain vehicle stability.

The tractor air brake system 10 is pneumatically connected to a towed vehicle, or trailer, air brake system (not shown) through a trailer control connection 36 and a trailer supply connection 38. The trailer supply connection 38 is pneumatically connected to the reservoirs 48 on the tractor through a control valve (not shown). The trailer control connection 36 is pneumatically connected to the trailer pressure control device 34. The trailer pressure control device 34 is typically an electro-pneumatic valve, for example, a Bendix M-32™ modulator. The trailer pressure control device 34 receives a brake control transmission signal from an output 58 of the towing vehicle controller 22 and converts the brake control transmission signal to a control air signal for the towed vehicle. Through the trailer pressure control device 34, the towing vehicle controller 22 of the tractor air brake system 10 is able to control the control air signal supplied to the trailer brake system.

The towing vehicle controller 22 receives a signal indicative of the combined load of the tractor and the coupled trailer from the load sensor 24 at a controller input 52. In one embodiment, the load sensor 24 is a pressure sensor connected to a tractor air suspension air bag. As the pressure in the air bag increases, the load signal value indicative of the combined load increases and, therefore, the load as determined by the towing vehicle controller 22 from the load signal increases. Other means may be used to determine the tractor-trailer load, such as on board scales, linear displacement sensors on the tractor chassis or vehicle mass estimation based on engine torque data. It is understood that the signal indicative of the tractor-trailer load may be received either directly through a controller input or through a vehicle serial communications bus.

The towing vehicle controller 22 also receives a signal or signals concerning a stability condition of the tractor, such as, for example, a yaw rate signal and a lateral acceleration signal from a yaw rate sensor 26 and lateral acceleration sensor 27, respectively. The yaw rate sensor 26 and the lateral acceleration sensor 27 are mounted on the tractor and may be discrete or packaged as a combination sensor, such as the Bendix YA-S60™ sensor. The yaw rate sensor 26 and lateral acceleration sensor 27 may communicate directly with an input 54 at the towing vehicle controller 22 or over the vehicle serial communication bus. Other sensors may be used to determine a stability condition at a tractor, including the steering angle sensor 46 or the wheel speed sensors 44. The towing vehicle controller 22 is able to use at least the load signal and stability condition signals to enhance the tractor and trailer braking response when the operator actuates the brake pedal 50 or independently of the operator.

In many situations, the tractor may be equipped with an automatic cruise control (ACC) system. In such cases, the towing vehicle controller 22 also receives information from a radar sensor 30 when the ACC system is activated by the operator. The radar sensor 30 is mounted on the tractor. The information from the radar sensor 30 is received by an input 56 on the towing vehicle controller 22 or over the vehicle serial communication bus. The information transmitted by the radar sensor 30 typically includes automated deceleration requests. A deceleration signal is created in response to the automated deceleration request when the ACC system determines the tractor needs to decelerate in order to maintain a certain following distance between the tractor and a target vehicle. The towing vehicle controller 22 typically responds to a deceleration signal first by dethrottling the engine, then activating a vehicle retarder. Lastly, the towing vehicle controller 22 applies the individual wheel end brakes on the tractor and sends the brake control transmission signal to the trailer pressure control device 34. If the vehicle is equipped with a Collision Mitigation System, then the towing vehicle controller 22 is continuously receiving and responding to deceleration signals from the radar sensor 30, first by alerting the operator of the reduced distance between the towing vehicle and the target object and then by applying the towing vehicle and towed vehicle brakes.

The towing vehicle controller 22 includes control logic for determining a towed vehicle brake control transmission signal based on the towed and towing vehicle combination load, at least one of the stability conditions and the deceleration request. The towed vehicle brake control transmission signal is transmitted via an output 58 on the towing vehicle controller 22 to the trailer pressure control device 34 for controlling the brakes on the trailer.

Figure 2:
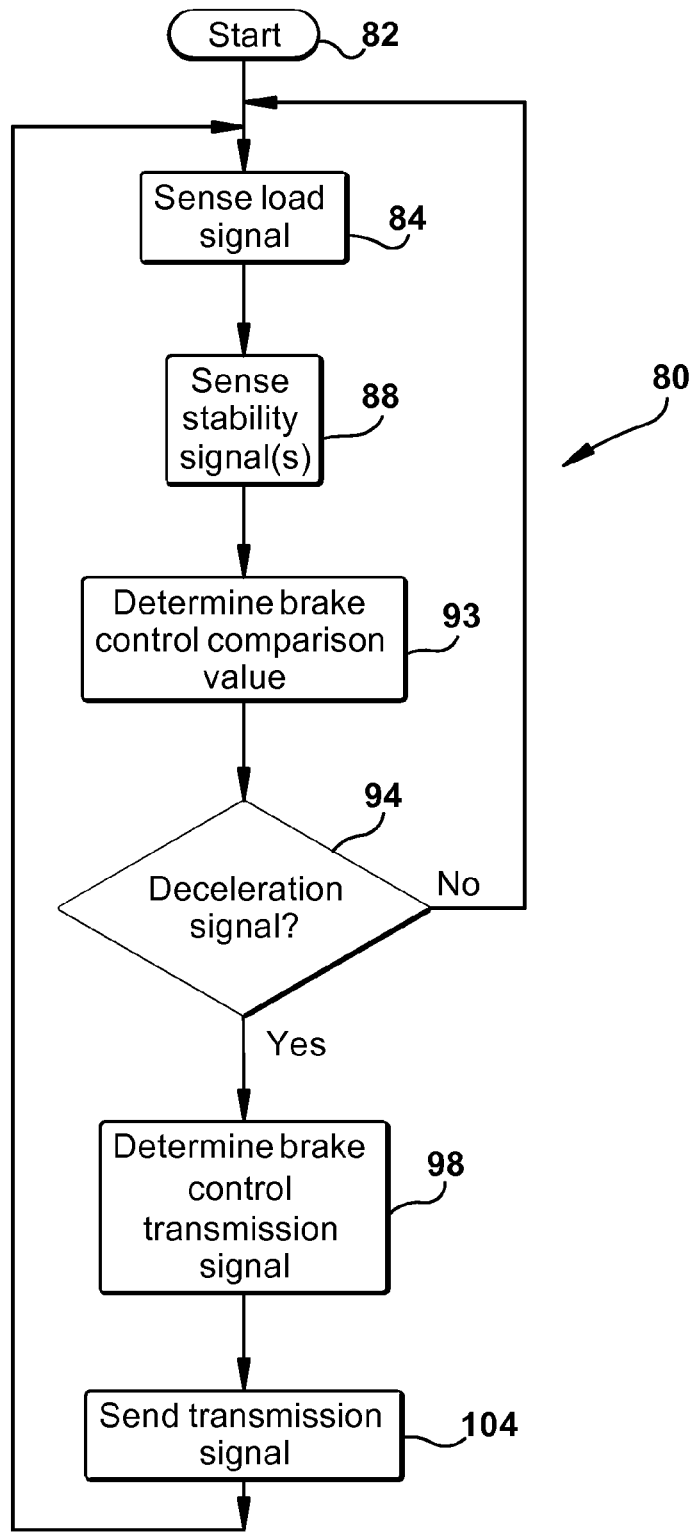
FIG. 2 illustrates a flowchart that describes a method for providing brake control to a towed vehicle, according to an embodiment of the present invention.

FIG. 2 shows a flowchart representing a method for providing brake control delivered to a towed vehicle, according to an embodiment of the present invention. Control algorithm 80 is used to determine the brake control transmission signal and is processed by control logic of the towing vehicle controller 22 (FIG. 1). The algorithm begins at step 82. The load signal indicative of vehicle load of the towing vehicle and the load of the towed vehicle is sensed at step 84.

At step 88, a stability signal indicative of a stability condition of the towing vehicle, or tractor, is sensed. The stability condition of the tractor is based on several factors, including but not limited to, the yaw rate of the tractor, the steering angle of the tractor, the lateral acceleration of the tractor or a combination of two or more of these conditions and in addition to other stability conditions received by the towing vehicle controller 22 (FIG. 1).

In step 93, a brake control comparison value is determined based on the load signal and the stability signal. The brake control comparison value is a set of data, including a pressure value and a pause time. The brake control comparison value is based on any one of the yaw rate signal, the lateral acceleration signal and the steering angle signal, as sensed in step 88. Each stability signal is compared independently with a respective threshold, as will be further described below.

In step 94, the towing vehicle controller 22 (FIG. 1) monitors for a deceleration signal of an automated deceleration request, as for example, from the ACC system. If no such deceleration signal is received, the algorithm returns to step 84. If a deceleration signal is received in step 94 and is of such a value that requires a brake application, as determined by the towing vehicle controller 22, control continues to step 98. In step 98, the towing vehicle controller 22 determines a brake control transmission signal based on the deceleration signal and the brake control comparison value. The control logic then transmits the brake control transmission signal in step 104. Control then returns to step 84.

Accordingly, in one embodiment a towing vehicle controller for providing brake control of a towed vehicle includes: a controller input 52 for receiving a load signal indicative of a load of a towed and towing vehicle combination; a controller input 54 for receiving a stability signal indicative of at least one of a yaw rate, a steering angle and a lateral acceleration of the towing vehicle; a controller input 56 for receiving a deceleration signal indicative of an automated deceleration request; and control logic. The control logic is capable of determining a brake control transmission signal based on a deceleration signal and brake control comparison value after receiving the deceleration signal, where the comparison value is based on a load signal and a stability signal received by the controller. In another embodiment a controller for providing a towed vehicle brake control includes at least one input for the load signal, the yaw rate signal and deceleration signal as describe above, and the controller having control logic. The control logic is capable of determining a yaw rate deviation based on a yaw rate signal received and brake control comparison value, where the comparison value are based on the yaw rate deviation and the load. The control logic is also capable of determining a brake control transmission signal after receiving the deceleration signal, where the determination is based on the comparison value and the deceleration signal.

A method for providing brake control for a towed vehicle from a towing vehicle includes sensing a load of the towing and towed vehicle combination and receiving a stability signal of the towing vehicle. The method further includes determining the comparison value, based on the load signal and the stability signal. After determining the comparison value, the method includes receiving a deceleration signal of an automated deceleration request and assigning a brake control transmission signal based on the deceleration signal and the comparison value.

Figure 3:
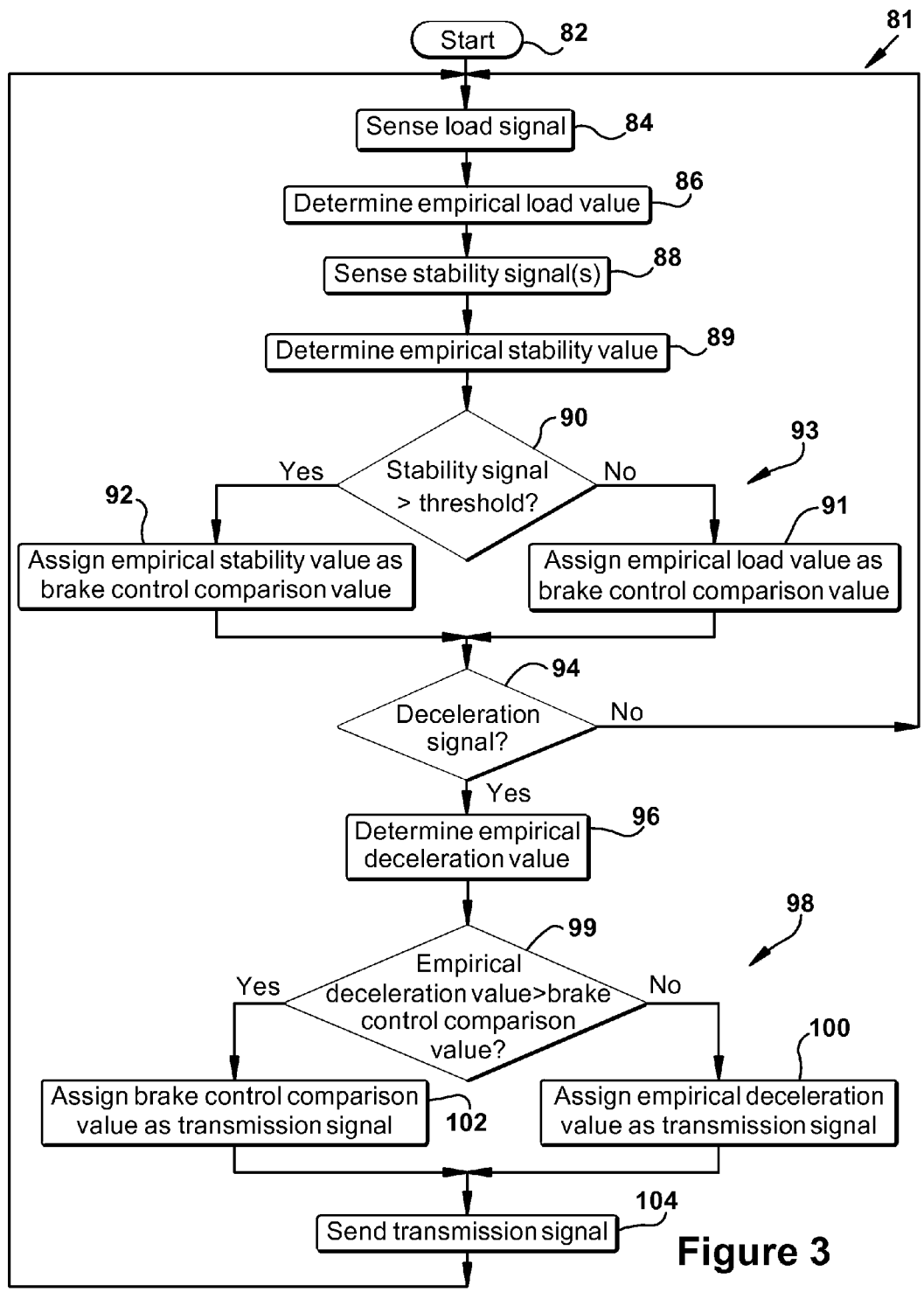
FIG. 3 illustrates a flowchart that describes a method for providing brake control to a towed vehicle, according to an embodiment of the present invention.

FIG. 3 shows a flowchart for implementing additional methods for providing brake control for a towed vehicle, according to alternative embodiments of the present invention. In one embodiment, control algorithm 81 is used to determine the brake control transmission signal and incorporates some of the same steps as the embodiments described above with respect to FIG. 2. The control algorithm 81 is processed by control logic of the towing vehicle controller 22. The algorithm begins at step 82. The load signal indicative of vehicle load is sensed at step 84. The towing vehicle controller 22 uses the load signal received from the load sensor 24 to determine the combined tractor-trailer load.

After receiving the load signal, the determination of an empirical load value at step 86 occurs prior to the towing vehicle controller 22 receiving a deceleration signal, for example, from an ACC system. The empirical load value is a set of data, including a pressure value and a pause time. As the combined tractor-trailer load increases, the empirical load pressure value increases as a function of the load. The empirical load pressure value, as determined as a function of the load, can range from about zero (0) pounds per square inch (psi) up to about one hundred and twenty (120) psi (8.4 bar). In another embodiment, the empirical load pressure value ranges from five (5) (0.35 bar) to ninety (90) psi (6.3 bar), preferably eighty (80) psi (5.5 bar). The pause time remains the same for all loads. For example, the pause time can be 0.5 seconds.

Next, at step 88, a stability signal indicative of a stability condition of the tractor is sensed. The stability condition can be determined by the yaw rate of the tractor, the steering angle of the tractor, the lateral acceleration of the tractor or a combination of two or more of these or a combination of any of these in addition to other stability conditions received by the towing vehicle controller 22.

In one embodiment, the yaw rate signal is sensed in step 88. The yaw rate signal is used to calculate a yaw rate deviation. Yaw rate deviation is calculated as the magnitude of the difference between the yaw rate signal and a reference yaw rate. The reference yaw rate is calculated using a vehicle dynamics model based on fundamental vehicle dynamics principles that combines the steering angle signal, the vehicle speed, vehicle characteristics, including but not limited to, wheelbase, steady-state understeer gradient and vehicle dynamic response lag time. The yaw rate deviation is then used as the stability signal in determining the brake control comparison value. In addition, the lateral acceleration signal and the steering angle signal can be sensed in step 88.

At step 89 an empirical stability value is determined from empirical load value and the stability signal. The empirical stability value is a set of data, including a pressure value and a pause time. The empirical stability value is determined for each stability signal separately, as will be further described below. A lookup table or similar arrangement is used to determine the empirical stability value for each stability signal value.

At step 93, a brake control comparison value is determined based on the load signal and the stability signal. The brake control comparison value is based on any one of the yaw rate signal, the lateral acceleration signal and the steering angle signal, as sensed in step 88. Each stability signal is compared independently with a respective threshold, as will be further described below. In the instance where the yaw rate signal, the lateral acceleration signal and the steering angle signal are less than a predetermined respective threshold, then only the load is used to determine the brake control comparison value in step 93.

The determination of a brake control comparison value, as depicted by step 93 of FIG. 2 includes additional steps. At step 90, the stability signal is compared to a predetermined threshold. The yaw rate deviation, the steering angle and the lateral acceleration are compared to respective predetermined thresholds at step 90. The predetermined threshold for the yaw rate deviation is about two degrees per second (2 deg/s) or greater. The predetermined threshold for the lateral acceleration is about one meter per second per second (1 m/s/s) or greater. The predetermined threshold for the steering angle is about thirty degrees (30°) or greater. If all of the stability conditions are below their respective predetermined thresholds, the empirical load value is assigned as the brake control comparison value, as in step 91. If any of the yaw rate deviation, the steering angle or the lateral acceleration is at or above their respective predetermined thresholds, the empirical stability value is assigned as the brake control comparison value, as in step 92. In an alternative embodiment, the lower of the empirical load value and the empirical stability value is assigned as the brake control comparison value when any one of the stability signals is greater than or equal to a predetermined threshold.

At step 94 the controller monitors for a deceleration signal of an automated deceleration request. If no automated deceleration request is received, the algorithm returns to step 84. If an automated deceleration request is received in step 94 and is of such a value that requires a brake application, as determined by the towing vehicle controller 22 (FIG. 1), an empirical deceleration value is determined based on the deceleration signal, as in step 96. The empirical deceleration value is a set of data, including a pressure value and a pause time. The empirical deceleration value is a function of the deceleration signal. The pressure value of the empirical deceleration value can range from 0 psi to one hundred twenty (120) psi (8.3 bar). As the deceleration signal increases, the pressure value of the empirical deceleration value increases in order to achieve the higher vehicle deceleration.

The determination of a brake control transmission signal, as depicted by step 98 of FIG. 2, includes additional steps. At step 99 the empirical deceleration value is compared to the brake control comparison value. If the brake control comparison value is less than the empirical deceleration value, then the brake control comparison value is assigned as the brake control transmission signal, as in step 102. If the brake control comparison value is greater than or equal to the empirical deceleration value, then the empirical deceleration value is assigned as the brake control transmission signal, as in step 100. The brake control transmission signal is sent to the trailer control device 34, as in step 104. Control then returns to step 84.

Accordingly, a method for controlling the brake pressure delivered to a towed vehicle from a towing vehicle includes sensing a load of the towing and towed vehicle combination; determining an empirical load value based on the load, receiving a stability signal of the towing vehicle and determining an empirical stability value based on the stability signal. The method further includes determining a comparison value, wherein the comparison value is the lower of the empirical load value and the empirical stability value when the stability signal is at least as great as a predetermined threshold, and the comparison value is the empirical load value when the stability signal is less than the predetermined threshold. After determining the comparison value, the method includes receiving a deceleration signal of an automated deceleration request; determining an empirical deceleration value based on the deceleration signal; comparing the comparison value to the empirical deceleration value after receiving the deceleration signal; assigning a brake control transmission signal to be the comparison value when the empirical deceleration value is greater than the comparison value and assigning the brake control transmission signal to be the empirical deceleration value when the empirical deceleration value is less than or equal to the comparison value; and transmitting the brake control transmission signal to a towed vehicle control device.

In one embodiment, the yaw rate signal is sensed in step 88. The yaw rate signal is used to calculate a yaw rate deviation. Yaw rate deviation is the magnitude of the difference between the yaw rate signal and a reference yaw rate. The reference yaw rate is calculated using a vehicle dynamics model based on fundamental vehicle dynamics principles that combines the steering angle signal, the vehicle speed, vehicle characteristics, including but not limited to, wheelbase, steady-state understeer gradient and vehicle dynamic response lag time. The yaw rate deviation is then used as the stability signal in determining the brake control comparison value. An empirical stability value is determined at step 89 based on the load and the yaw rate deviation. In determining the empirical stability value, the pressure value of the empirical load value is adjusted by a pressure reduction factor to achieve a new pressure value, for example. The pause time is adjusted by a pause factor to obtain a new pause time. Therefore, the empirical stability value includes a new pressure value and a new pause time based on the empirical load value.

In another embodiment, the empirical stability value is determined using the yaw rate deviation. In another embodiment the empirical stability value is determined using only the yaw rate deviation and no other stability factors.

The yaw rate deviation is compared to a predetermined threshold at step 90. The predetermined threshold for the yaw rate deviation is about two degrees per second (2 deg/s) or greater. If the yaw rate deviation is below the predetermined threshold, the empirical load value is assigned as the brake control comparison value, as in step 91.

In another embodiment, the lateral acceleration signal is sensed in step 88. The empirical stability value, as determined in step 89, is then based on the load and at least one of the yaw rate deviation and the lateral acceleration. Both the yaw rate deviation and the lateral acceleration are compared to respective predetermined thresholds at step 90. The predetermined threshold for the yaw rate deviation is about two degrees per second (2 deg/s) or greater. The predetermined threshold for the lateral acceleration is about one meter per second per second (1 m/s/s) or greater. If both of the stability signals are below their respective predetermined thresholds, the empirical load value is assigned as the brake control comparison value, as in step 91.

In another embodiment, the steering angle signal is sensed in step 88. The empirical stability value as determined in step 89 is then based on the load and at least one of the yaw rate deviation, the steering angle, and the lateral acceleration. The yaw rate deviation, the steering angle and the lateral acceleration are compared to respective predetermined thresholds at step 90. The predetermined threshold for the yaw rate deviation is about two degrees per second (2 deg/s) or greater. The predetermined threshold for the lateral acceleration is about one meter per second per second (1 m/s/s) or greater. The predetermined threshold for the steering angle is about thirty degrees (30°) or greater. If all of the stability signals are below their respective predetermined thresholds, the empirical load value is assigned as the brake control comparison value, as in step 91.

If any one of the yaw rate deviation, the lateral acceleration signal or the steering angle signal is at or above its respective predetermined threshold, the empirical stability value is assigned as the brake control comparison value, as in step 92.

In one embodiment, the yaw rate deviation value will affect the pressure value and the pause time of the empirical stability value. For example, when the yaw rate deviation ranges from about two degrees per second (2 deg/s) to about six degrees per second (6 deg/s), a pressure reduction from the pressure value of the empirical load value of about 0% to about 60% will be implemented. For example, if the pressure reduction for a particular yaw rate deviation is 50% and the pressure value from the empirical load value is one hundred (100) psi, then the pressure of the empirical stability value is fifty (50) psi. Therefore, when the pressure reduction is combined with an empirical load pressure value, the calculated pressure value for the empirical stability value can range from about 85 psi (5.5 bar) down to about thirty four (34) psi (2.3 bar). As the yaw rate deviation increases, the pressure value of the empirical stability value decreases. Therefore, there is a lower pressure value for the empirical stability value than in the empirical load value. The pause factor of the empirical stability value is increased as the yaw rate deviation increases. For example, when the yaw rate deviation ranges from at least about 2 deg/s to 6 deg/s, a pause factor of at least one through four will be implemented. The pause factor is combined with the pause time of the empirical load value. For example, the calculated pause time of the empirical stability value can range from about 0.5 seconds to about two (2) seconds.

In another embodiment, a yaw rate deviation of about four degrees per second (4 deg/s) will result in a pressure reduction factor of about 20% to about 30%, and in another embodiment, about 23% to about 28%, and in another embodiment about 25%. A yaw rate deviation of at least 4 deg/s but less than six degrees per second (6 deg/s) will result in a pressure reduction factor that ranges from about 30% to about 60%, in another embodiment from about 45% to 55%, and in another embodiment about 50%. A yaw rate deviation at or above 6 deg/s will result in a pressure reduction factor of up to about 60%. Therefore, the empirical stability value will have a lower pressure value than the pressure value of the empirical load value when the yaw rate deviation exceeds 2 deg/s. The pause factor will be between one and four, making the pause time of the empirical stability value generally longer than the pause time of the empirical load value.

In another embodiment, the lateral acceleration will affect the pressure value and the pause time of the empirical stability value. For example, when the lateral acceleration ranges from about one meter per second per second (1 m/s/s) to about three meters per second per second (3 m/s/s), a pressure reduction factor of about 0% to about 50% will be implemented. Therefore, when combined with the empirical load pressure value of 85 psi (5.5 bar), the pressure value for the empirical stability value due to the lateral acceleration can range from about 85 psi (5.5 bar) down to forty-two (42) psi (2.9 bar). A lateral acceleration of at least 1 m/s/s but less than two meters per second per second (2 m/s/s) will result in a pressure reduction factor of about 15% to about 30%, and in another embodiment about 18% to 25%, and in another embodiment about 20%. A lateral acceleration of at least 2 m/s/s but less than 3 m/s/s will result in a pressure reduction factor that ranges from about 30% to about 50%, in another embodiment from about 35% to about 45% and in another embodiment about 40%. A lateral acceleration at or above 3 m/s/s will result in a pressure reduction factor of up to about 50%. As the lateral acceleration increases, the pressure value of the empirical stability value decreases. Therefore, the pressure value of the empirical stability value will be less than the pressure value of the empirical load value. The pause factor will be between one and four, making the pause time of the empirical stability value generally longer than the pause time of the empirical load value. For example, the pause time of the empirical stability value can be from 0.5 seconds through two (2) seconds.

In yet another embodiment, the steering angle will affect the pressure value and the pause time of the empirical stability value. For example, when the steering angle ranges from about 30 degrees (30°) to less than 60 degrees (60°), a pressure reduction of about 0% to about 50% will be implemented. Therefore, the pressure value for the empirical stability value due to the change in steering angle can range from about 85 psi (5.5 bar) down to forty two (42) psi (2.9 bar). As the steering angle increases, the pressure value of the empirical stability value decreases. A steering angle of at least 30° but less than 45 degrees) (45° will result in a pressure reduction of about 15% to about 30%, and in another embodiment about 18% to 25%, and in another embodiment about 20%. A steering angle of at least 45° but less than 60° will result in a pressure reduction that ranges from about 30% to about 50%, in another embodiment from about 35% to about 45% and in another embodiment about 40%. A steering angle at or above 60° will result in a pressure reduction factor of up to about 50%. Therefore, the pressure value of the empirical stability value will be less than the pressure value of the empirical load value. The pause factor will be between one and four, making the pause time of the empirical stability value generally longer than the pause time of the empirical load value. For example, the pause time of the empirical stability value can be from 0.5 seconds through two (2) seconds.

Using the above determinations, the empirical stability value generally has a lower pressure value and a longer pause time than the empirical load value. When any one of the stability conditions is above the predetermined threshold, the pressure limit of the empirical stability value is generally 5% to 60% lower than the pressure limit and the pause time is generally one to four times greater than the pause time of the empirical load value.

If each of the yaw rate deviation, the steering angle signal and the lateral acceleration signal are above their respective thresholds, the one with the lowest pressure value and longest pause time will be used to determine the empirical stability value, as set in step 89.

Accordingly, in one embodiment of the present invention a method for providing brake control for a towed vehicle includes: receiving a load signal indicative of a load of a towed vehicle; determining an empirical load value as a function of the load; receiving a stability signal indicative of a yaw rate of a towing vehicle and determining a yaw rate deviation based on the yaw rate signal. The method also includes determining an empirical stability value based on the yaw rate deviation; determining a comparison value as a function of the empirical load value and the empirical stability value; receiving the deceleration signal of an automated deceleration request; determining an empirical deceleration value based on the deceleration request; and determining a brake control transmission signal after determining the empirical deceleration value.

Figure 4:
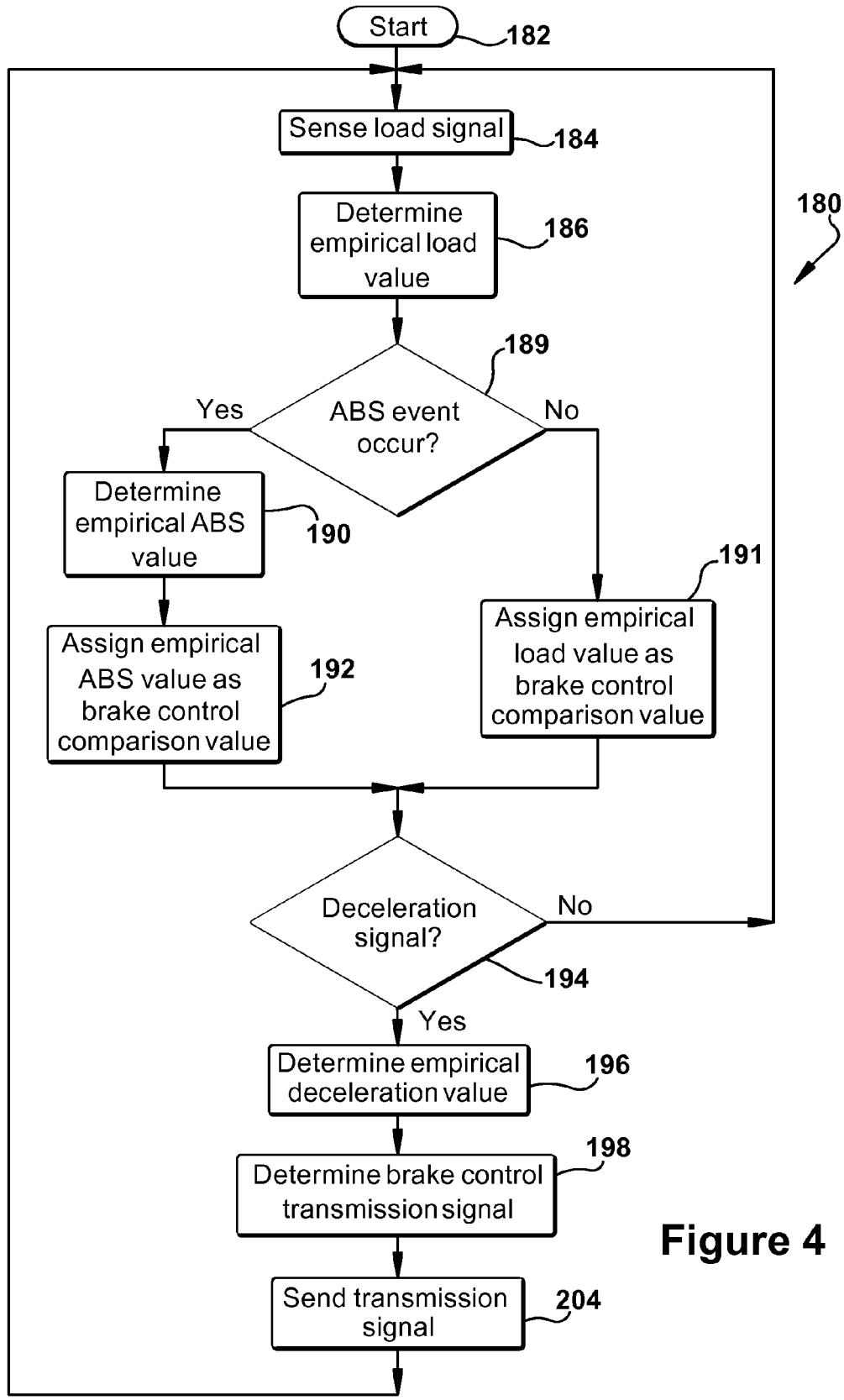
FIG. 4 illustrates a flowchart that describes a method for providing brake control to a towed vehicle, according to an embodiment of the present invention.

FIG. 4 shows a flowchart for implementing additional methods for providing brake control for a towed vehicle. In one embodiment, control algorithm 180 is used to determine the brake control transmission signal and incorporates some of the same steps as the embodiments described above with respect to FIG. 2. The control algorithm begins at step 182. The load signal indicative of vehicle load is sensed at step 184. The towing vehicle controller 22 uses the load signal received from the load sensor 24 to determine the combined tractor-trailer load. The empirical load value is determined at step 186.

The towing vehicle controller 22 monitors whether an antilock braking system (ABS) event has occurred on the towing vehicle, as in step 189. The occurrence of an ABS event may be an indication that the road surface has a low coefficient of friction. If an ABS event has occurred during a predetermined time period (e.g. since last ignition cycle), the empirical ABS value is determined and the brake control comparison value are the empirical ABS value, as in step 192. For example, when an ABS event has occurred, a pressure reduction from the empirical load pressure value of about 50% and a pause time of 2 seconds will be implemented. If no ABS event has occurred, then the brake control comparison value is based only on the empirical load value, as in step 191.

In step 194, the stability controller 22 monitors for an automated deceleration request, as for example, from the ACC system. If no such automated deceleration request is received, the algorithm returns to step 184. The determination of the empirical load value and the empirical stability value is repeated in steps 184 through 192.

If an automated deceleration request is received in step 194 and is of such a value that requires a brake application, as determined by the towing vehicle controller 22, the empirical deceleration value are determined based on the deceleration signal, as in step 196. The towing vehicle controller 22 then determines a brake control transmission signal based on the deceleration signal and the brake control comparison value, as in step 198. The determination of the brake control transmission signal, as depicted in step 198, includes steps similar to steps 99, 100 and 102 in FIG. 3. The empirical deceleration value is compared to the brake control comparison value. If the brake control comparison value is less than the empirical deceleration value, then the brake control comparison value is assigned as the brake control transmission signal. If the brake control comparison value is greater than or equal to the empirical deceleration value, then the empirical deceleration value is assigned as the brake control transmission signal, as in step 204. The brake control transmission signal includes a pressure value and a pause time. The brake control transmission signal is sent to the trailer control device 34, as in step 204. Control then returns to step 184.

Alternatively, the empirical deceleration value is compared with the lower of the empirical load value and the empirical stability value. If the empirical deceleration value is less than the lower of the empirical load value and the empirical stability value, the empirical deceleration value is assigned as the brake control transmission signal. If the empirical deceleration value is greater than the lower of the empirical load value and the empirical stability value, the brake control transmission signal is based on the lower of the empirical load value and the empirical stability value.

The towing vehicle controller 22 uses the brake control transmission signal to create a pulsed signal for transmission to the trailer pressure control device 34. The pulsed signal includes on and off times to achieve the desired pressure value that is part of the brake control transmission signal. The pause time is when no signal is being transmitted to the trailer pressure control device 34. Pulsing the control signal sent to the towed vehicle brake system from the towed vehicle brake control device 34 means that short phases of time with little or no brake pressure are inserted between phases of time in which the pressure value of the brake control transmission signal is applied to the towed vehicle brakes. In this manner, both stopping distance and stability is improved for the tractor-trailer combination during an automated deceleration event.

If the operator actuates the brake pedal, the operator requested braking value will be transmitted to the towed vehicle if the operator requested braking pressure value is greater than the pressure value in the brake control transmission signal as determined by the control logic. The steps of the control algorithms 80, 81 and 180 continue during the operator initiated braking event.

Accordingly, in one embodiment the towing vehicle controller includes inputs for receiving signals indicative of a load of a towed and towing vehicle combination, inputs for receiving a signal indicative of at least one of a yaw rate of a towing vehicle, a steering angle of a towing vehicle and a lateral acceleration of the towing vehicle, and inputs for an automated deceleration request. The controller also includes control logic capable of determining a set of empirical values prior to receiving an automated deceleration request. The control logic determines a brake control transmission signal to send to the towed vehicle braking system after a deceleration request based on pressure values established by the input signal of the load and the input signal of at least one of the yaw rate signal, the steering angle and the lateral acceleration signal.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A towing vehicle controller for providing brake control of a towed vehicle comprising:
   a controller load input for receiving a load signal indicative of a sensed load of a towed and towing vehicle combination;
   a controller stability input for receiving a stability signal indicative of at least one of a sensed yaw rate, a sensed steering angle and a sensed lateral acceleration of the towing vehicle;
   a controller deceleration input for receiving a deceleration signal indicative of an automated deceleration request; and
   control logic capable of:
   determining an empirical load value based on the load signal;
   determining an empirical stability value based on the stability signal;
   determining a comparison value is the empirical load value when the stability signal is less than a predetermined stability threshold, and the comparison value is the empirical stability value when the stability signal is greater than or equal to the predetermined stability threshold; and
   determining a brake control transmission signal after receiving a deceleration signal, wherein the determination is based on the deceleration signal and the comparison value.

2. The controller of claim 1 wherein: the control logic is further capable of determining an empirical deceleration value based on the automated deceleration signal; and the brake control transmission signal is the empirical deceleration value when the empirical deceleration value is less than or equal to the comparison value, and the brake control transmission signal is the comparison value when the empirical deceleration value is greater than the comparison value.

3. The controller of claim 1 further comprising: a controller output for transmitting the brake control transmission signal.

4. The controller of claim 1 wherein the controller input for receiving the deceleration signal is a serial communication bus input.

5. The controller of claim 1, wherein the control logic is further capable of:
   determining a yaw rate deviation based on the yaw rate signal; and
   determining an empirical stability value based on the load signal and at least one of the yaw rate deviation, the steering angle signal and the lateral acceleration signal.

6. The controller of claim 5 wherein:
   the control logic is further capable of determining an empirical deceleration value based on the deceleration signal; and
   the control logic is further capable of comparing the empirical deceleration value to the empirical stability value when the yaw rate deviation is at least as great as a predetermined yaw rate deviation threshold.

7. The controller of claim 6, wherein the predetermined yaw rate deviation threshold is at least about 2 deg/s.

8. The controller of claim 5 wherein:
   the control logic is further capable of determining an empirical deceleration value based on the deceleration signal; and
   the control logic is further capable of comparing the empirical deceleration value to the empirical stability value when the lateral acceleration is at least as great as a predetermined lateral acceleration threshold.

9. The controller of claim 8, wherein the lateral acceleration threshold is at least about 1 m/s/s.

10. The controller of claim 5 wherein:
    the control logic is further capable of determining an empirical deceleration value based on the deceleration signal; and the control logic is further capable of comparing the empirical deceleration value to the empirical stability value when the steering angle is at least as great as a predetermined steering angle threshold.

11. The controller of claim 10, wherein the steering angle threshold is at least about 30 degrees.

12. The controller of claim 5 wherein further comprising: determining an empirical load value based on the load signal, wherein the empirical stability value comprises a pressure value that ranges from between about 0% to about 50% lower than a pressure value of the empirical load value.

13. A method for providing brake control for a towed vehicle from towing vehicle, the method comprising:
sensing a load signal indicative of a load of the towing and towed vehicle combination;
sensing a stability signal indicative of a stability condition of the towing vehicle, the stability signal indicative of at least one of a yaw rate, a steering angle and a lateral acceleration of the towing vehicle;
determining an empirical load value based on the load signal;
determining an empirical stability value based on the stability signal;
determining a comparison value based on the empirical load value and the empirical stability value;
wherein the comparison value is the empirical load value when the stability signal is less than a predetermined stability threshold, and the comparison value is the empirical stability value when the stability signal is greater than or equal to the predetermined stability threshold;
receiving a deceleration signal as part of an automated deceleration request after determining the comparison value;
determining a brake control transmission signal based on the deceleration signal and the comparison value.

14. The method of claim 13, further comprising:
determining an empirical deceleration value based on the automated deceleration signal; and
wherein the brake control transmission signal is the empirical deceleration value when the empirical deceleration value is less than or equal to the comparison value, and the brake control transmission signal is the comparison value when the empirical deceleration value is greater than the comparison value.

15. The method of claim 13, wherein sensing the stability condition of the towing vehicle comprises sensing at least one of a lateral acceleration signal, a steering angle signal and a yaw rate signal.

16. The method of claim 15, wherein the predetermined threshold of the yaw rate signal is at least about 2 deg/s.

17. The method of claim 15, wherein the predetermined threshold of the lateral acceleration signal is at least about 1 m/s/s.

18. The method of claim 15, wherein the predetermined threshold of the steering angle signal is at least about 30 degrees.

19. The method of claim 13 further comprising:
activating the towed vehicle control device according to the brake control transmission signal to achieve a corresponding brake pressure limit.

20. The method of claim 19, wherein the pressure value of the comparison value ranges from between about 0% to about 50% lower than a pressure value of the empirical load value.

21. The method of claim 13 further comprising: transmitting the brake control transmission signal to a towed vehicle control.

* * * * *